US012565449B2

(12) United States Patent
Termkhajornkit et al.

(10) Patent No.: US 12,565,449 B2
(45) Date of Patent: Mar. 3, 2026

(54) ULTRA-HIGH PERFORMANCE CONCRETES WITH HIGH EARLY STRENGTH

(71) Applicant: Amrize Technology Switzerland LLC, Zug (CH)

(72) Inventors: Pipat Termkhajornkit, Holderbank (CH); Caroline Meulenyzer, Holderbank (CH); Mohamed-Amine Handour, Holderbank (CH)

(73) Assignee: Amrize Technology Switzerland LLC, Zug (CH)

( * ) Notice: Subject to any disclaimer, the term of this patent is extended or adjusted under 35 U.S.C. 154(b) by 762 days.

(21) Appl. No.: 17/778,713

(22) PCT Filed: Jan. 12, 2021

(86) PCT No.: PCT/EP2021/050474
§ 371 (c)(1),
(2) Date: May 20, 2022

(87) PCT Pub. No.: WO2021/144258
PCT Pub. Date: Jul. 22, 2021

(65) Prior Publication Data
US 2023/0002282 A1 Jan. 5, 2023

(30) Foreign Application Priority Data

Jan. 14, 2020 (EP) .................................... 20305020

(51) Int. Cl.
| | |
|---|---|
| *C04B 28/04* | (2006.01) |
| *C04B 7/02* | (2006.01) |
| *C04B 14/06* | (2006.01) |
| *C04B 22/00* | (2006.01) |
| C04B 103/32 | (2006.01) |
| C04B 103/50 | (2006.01) |
| C04B 111/72 | (2006.01) |

(52) U.S. Cl.
CPC ................ *C04B 28/04* (2013.01); *C04B 7/02* (2013.01); *C04B 14/06* (2013.01); *C04B 22/002* (2013.01); *C04B 2103/32* (2013.01); *C04B 2103/50* (2013.01); *C04B 2111/72* (2013.01)

(58) Field of Classification Search
CPC .......... C04B 28/04; C04B 7/02; C04B 14/06; C04B 22/002; C04B 2103/32; C04B 2103/50; C04B 2111/72; C04B 2111/10; C04B 2111/723; C04B 2201/52; Y02W 30/91
See application file for complete search history.

(56) References Cited

U.S. PATENT DOCUMENTS

| | | | |
|---|---|---|---|
| 2012/0037045 A1 | 2/2012 | Fonollosa et al. | |
| 2015/0203407 A1* | 7/2015 | Girot ...................... | C04B 28/04 427/140 |

FOREIGN PATENT DOCUMENTS

| | | | |
|---|---|---|---|
| EP | 2 695 992 A2 | 2/2014 | |
| JP | S62-65962 A | 3/1987 | |
| JP | 2002-338324 A | 11/2002 | |
| JP | 2009-196856 A | 9/2009 | |
| JP | 2011-102222 A | 5/2011 | |
| RU | 2 369 575 C1 | 10/2009 | |
| WO | WO-2015193419 A1 * | 12/2015 | ............. C04B 14/04 |

OTHER PUBLICATIONS

Kaufmann et al. (Effect of the addition of ultrafine cement and short fiber reinforcement on shrinkage, rheological and mechanical properties of Portland cement pastes, Cement & Concrete Composites, 26, pp. 541-549) (Year: 2004).*

WO_2015193419_A1_Machine Translation (Year: 2015).*

International Search Report as issued in International Patent Application No. PCT/EP2021/050474, dated Apr. 8, 2021.

* cited by examiner

*Primary Examiner* — Amber R Orlando
*Assistant Examiner* — Anastasia A. Kuvayskaya
(74) *Attorney, Agent, or Firm* — Osha Bergman Watanabe & Burton LLP

(57) ABSTRACT

A hydraulic composition includes in relative parts by mass with respect to first Portland cement: 100 parts of a first Portland cement the particles of which have a D50 between 10 and 25 μm; from 25 to 76 parts of a second Portland cement the particles of which have a D50 between 0.5 and 6 μm; from 85 to 200 parts of sand; water; the water content being such that the hydraulic composition includes from 170 to 250 kg of water per cubic metre of hydraulic composition; the volume distribution of particle size of the first Portland cement and of the second Portland cement being further such that the ratio D50 of the first Portland cement/D50 of the second Portland cement is greater than 2.

16 Claims, No Drawings

ULTRA-HIGH PERFORMANCE CONCRETES WITH HIGH EARLY STRENGTH

CROSS-REFERENCE TO RELATED APPLICATIONS

This application is the U.S. National Stage of International Application Serial No. PCT/EP2021/050474, filed Jan. 12, 2021, which in turn claims priority to European Application No. 20305020.8, filed Jan. 14, 2020. The contents of all of these applications are incorporated herein by reference in their entirety.

FIELD OF THE INVENTION

The invention relates to a hydraulic composition which permits to obtain ultra-high-performance concrete with high early strength, a method for producing said hydraulic composition, and the use of said hydraulic composition in the restauration and repair of infrastructure elements such as bridge decks, pillars, beams or dams.

TECHNOLOGICAL BACKGROUND

Ultra-high early performance concretes (UHPCs) are well known in the field of construction since the 1990s. These concretes are able to develop a final compressive strength, measured after 28 days of curing, of at least 100 MPa, and generally greater than 120 MPa.

The strength of such concrete compositions develops gradually until reaching the final values; known UHPC compositions typically develop strength at 24 hours of typically 70 to 110 MPa.

In many applications a UHPC having a very high early strength would have strong advantages. For example, in the reparation and strengthening of an aging bridge deck, using a UHPC that can develop very high early strength in the first 24 hours would reduce the duration traffic is blocked or limited.

Such performance profile of the concretes would be also advantageous in the preparation of precast concrete, as the high strength at 24 hours enables the concrete elements to be delivered to the customer the day following their production, with no additional curing and hardening time.

There is therefore a strong need for a hydraulic composition allowing to obtain ultra-high performance concrete with high early strength.

DESCRIPTION

An aim of the present invention is to provide a hydraulic composition which permits to obtain ultra-high-performance concretes with high early strength.

In a first aspect, the present invention relates to a hydraulic composition comprising in relative parts by mass with respect to first Portland cement:

100 parts of a first Portland cement the particles of which have a D50 comprised between 10 and 25 μm, preferably between 10 and 16 μm, even more preferably between 11 and 15 μm;

from 25 to 76 parts of a second Portland cement the particles of which have a D50 comprised between 0.5 and 6 μm, preferentially between 0.5 and 5 μm;

from 85 to 200 parts of sand; and water;

the water content being such that the hydraulic composition comprises from 170 to 250 kg of water per cubic metre of hydraulic composition;

the volume distribution of particle size of the first Portland cement and of the second Portland cement being further such that the ratio D50 of the first Portland cement/D50 of the second Portland cement is greater than 2.

The invention also relates to a hydraulic binder comprising in relative parts by mass with respect to first Portland cement:

100 parts of a first Portland cement the particles of which have a D50 comprised between 10 and 25 μm, preferably between 10 and 16 μm, even more preferably between 11 and 15 μm;

from 25 to 76 parts of a second Portland cement the particles of which have a D50 comprised between 0.5 and 6 μm, preferentially between 0.5 and 5 μm;

from 85 to 200 parts of sand; and the volume distribution of particle size of the first Portland cement and of the second Portland cement being further such that the ratio D50 of the first Portland cement/D50 of the second Portland cement is greater than 2.

In the invention, unless otherwise stated, the component amounts are expressed in part by mass for 100 parts by mass of the first Portland cement.

Advantages

Surprisingly, the inventors found that hydraulic compositions according to the invention permit to obtain efficient UHPCs providing compressive values of at least 160 MPa, preferentially 180 MPa, even more preferably 190 MPa at 28 days. Even more surprisingly, such hydraulic compositions permit to obtain UHPCs that acquire very quickly an important compressive strength of at least 130 MPa, preferably 140 MPa at 24 hours.

Thus, not only the concretes of the invention present very high compressive strength at 28 days, but also, they reach compressive strengths higher than those of conventional UHPCs in less than 24 h. This is particularly advantageous in the area of the reparation and strengthening of aging infrastructure elements such as bridge decks, pillars, beams or dams.

Another advantage of the hydraulic compositions according to the invention lies in their rheology. In particular, the hydraulic compositions of the invention are self-levelling, meaning the characteristic that the hydraulic composition spread over a rough surface settles on its own to a horizontal level, without the intervention of any professional or any specific tool.

The compositions of the invention present other advantages which will be detailed hereinafter.

The hydraulic composition according to the invention both includes compositions in a fresh condition and in the set condition, for example a cement slurry, a mortar or a concrete.

Cements

The hydraulic composition of the invention contains a first Portland and a second Portland cement.

Cement Types

Portland cements are typically those defined in the European standard NF EN 197-1 as of April 2012 and those described in the ASTM C150-12 standard.

The first and the second Portland cement may for example be selected from CEM I, CEM II, CEM III, CEM IV, or CEM V cements as defined in the European standard NF EN 197-1 as of April 2012. The type of first and the second Portland cements may be identical or different.

The first and/or the second Portland cement may be a CEM I cement. Preferentially, at least one and first and second cement Portland is a CEM I cement, more preferentially both first and second Portland cements are CEM I.

Cement Particles Size

As used herein, D90, also noted as DV90, corresponds to the 90th centile of the volume distribution of particle sizes, i.e. 90% of the volume consists of particles for which the size is less than D90 and 10% with a size greater than D90. D50, also noted as DV50, corresponds to the 50th centile of the volume distribution of particle sizes, i.e. 50% of the volume consists of particles for which the size is less than D50 and 50% with a size greater than D50. D10, also noted as DV10, correspond to the 10th centile of the volume distribution of particle sizes, i.e. 10% of the volume consists of particles for which the size is less than D10 and 90% with a size greater than D10. D10, D50 or D90 of a set of particles may generally be determined by laser grain size measurement for particles with a size of less than 800 μm, or by screening for particles with a size of more than 63 μm.

Cement Particle Size: First Cement

The first Portland cement for use according to the present invention is a cement the particles of which have a D50 comprised between 10 and 25 μm, preferentially between 11 and 15 μm, more preferably between 12 and 15 μm.

Advantageously, the first Portland cement for use according to the present invention are cements the particles of which have a D10 comprised between 1 and 8 μm, more advantageously between 1 and 5 μm.

Advantageously, the first Portland cement for use according to the present invention are preferably cements the particles of which have a D90 comprised between 30 and 70 μm, more advantageously between 30 and 40 μm.

Cement Particle Size: Second Cement

The second Portland cement for use according to the present invention is a cement the particles of which have a D50 comprised between 0.5 and 6 μm, advantageously between 0.5 and 5 μm, more advantageously between 0.5 and 4 μm, even more advantageously between 0.5 and 3 μm.

Advantageously, the second Portland cement for use according to the present invention are cements the particles of which have a D10 comprised between 1 and 6 μm, advantageously between 1 and 5 μm, more advantageously between 1 and 4 μm or even more advantageously between 1 and 3 μm.

Advantageously, the second Portland cement for use according to the present invention are preferably cements the particles of which have a D90 comprised between 5 and 20 μm, more advantageously between 5 and 10 μm.

Second Portland Cement: Amounts Relative to First Portland Cement

The hydraulic composition comprises, in relative parts by mass with respect to first Portland cement from 25 to 76 parts of second Portland cement, for example from 25 to 70 parts, advantageously from 25 to 65 parts, even more advantageously from 25 to 60 parts of second Portland cement.

Advantageously, the hydraulic composition may comprise from 36 to 76 parts of second Portland cement, for example from 36 to 70 parts, advantageously from 36 to 65 parts, even more advantageously from 36 to 60 parts of second Portland cement. Advantageously, the hydraulic composition may comprise from 40 to 76 parts of second Portland cement, advantageously from 40 to 70 parts, more advantageously from 40 to 65 parts, even more advantageously from 40 to 60 parts of second Portland cements, as expressed in relative parts by mass with respect to first Portland cement. The hydraulic composition may for example comprise from 45 to 65, advantageously 47 to 62 parts of second Portland cements, as expressed in relative parts by mass with respect to first Portland cement.

Ratio D50 First Portland Cement/D50 Second Portland Cement

The volume distribution of particle size of the first Portland cement and of the second Portland cement being further such that the ratio D50 of the first Portland cement/D50 of the second Portland cement is greater than 2 and may for example be comprised between 2 and 15, advantageously 2 and 10, even more advantageously between 3 and 5.

Preparation of Second Portland Cement

In an embodiment, a first Portland cement as those defined above may be milled and/or separated (using a dynamic separator) to obtain a second Portland cement according to the invention, having a target D50 as recited herein, for example a D50 of less than 6 μm, advantageously of less than 5 μm.

The first cement may be milled using methods known from the skilled person in the art, for example by jet air grinding.

Mineral Components

The hydraulic composition according may comprise from 0 to 60 parts as expressed in relative parts by mass with respect to first Portland cement, and preferably less than 20 parts, of one or more mineral components selected from silica fumes (e.g. such as defined in European standard NF EN 197-1 of February 2001 paragraph 5.2.7), pozzolanic materials (e.g. such as defined in European standard NF EN 197-1 of February 2001 paragraph 5.2.3), slags (e.g. such as defined in European standard NF EN 197-1 of February 2001 paragraph 5.2.2), calcined shales (e.g. such as defined in European standard NF EN 197-1 of February 2001 paragraph 5.2.5), materials containing calcium carbonate, limestone for example (e.g. such as defined in European standard NF EN 197-1 of February 2001 paragraph 5.2.6), siliceous additions (e.g. such as defined in French standard NF P 18-509 of December 1998 paragraph 5), fly ashes (e.g. such as defined in European standard NF EN 197-1 of February 2001 paragraph 5.2.4) or mixtures thereof.

Advantageously, the hydraulic composition may contain less than 15 parts of mineral component(s) detailed above, preferably of silica fume or of limestone, or of mixtures thereof, for example less than 12 parts, preferably less than 10 parts, even more preferably less than 1 part as expressed in relative parts by mass with respect to first Portland cement.

Advantageously, the hydraulic binder comprises less than 5, 4, 3, 2 parts, or even less than 1 part of mineral component(s), preferably of silica fume or of limestone, for example of a silica fume having a D50 comprised between and 0.1 and 0.5 μm, or of mixtures thereof, as expressed in relative parts by mass with respect to first Portland cement.

In a particular embodiment, the hydraulic composition contains only residues i.e. less than 0.1, advantageously less than 0.01, even more advantageously less than 0.001 part of the limestone filler and/or the silica fume as defined herein, as expressed in relative parts by mass with respect to first Portland cement.

Advantage

The inventors have shown that, very unexpectedly, hydraulic compositions according to the invention present particularly high compressive strength values even in the absence of mineral components such as ground limestone or silica fume.

Sand

The hydraulic composition according to the invention comprises, in relative parts by mass with respect to first Portland cement, from 85 to 200 parts of sand, for example from 85 to 170 parts of sand, even more advantageously 85 to 150 parts of sand.

Advantageously, the hydraulic composition comprises from 100 to 170 parts of sand, more advantageously 100 to 150 parts of sand, in relative parts by mass with respect to first Portland cement.

Advantageously, the hydraulic composition comprises from 110 to 170 parts of sand, more advantageously 110 to 150 parts of sand, in relative parts by mass with respect to first Portland cement.

Sand Granulometry

The sand for use according to the present invention advantageously has particles the D50 of which is of at least 200 μm, preferably is comprised between 200 μm and 3 mm. preferentially 200 μm and 1 mm.

The particles may for example have a D50 comprised between 200 μm and 1 mm, 200 μm and 800 μm, 200 μm and 500 μm, 250 μm and 1 mm, 250 μm and 800 μm, 250 μm and 500 μm may advantageously be used.

The sand for use according to the present invention advantageously has particles having a D10 comprised from 100 μm to 1 mm, preferably from 150 μm to 400 μm.

The sand for use according to the present invention advantageously has particles having a D90 of 300 μm to 5 mm, preferably 300 μm to 2 mm, more preferably a D90 comprised from 300 μm to 1 mm, further preferably a D90 comprised from 300 μm to 600 μm.

Sand Nature

Preferably, the sand for use according to the invention is a siliceous sand such as quartz sand, a calcined or non-calcined bauxite sand, a silica-calcareous sand or mixtures thereof.

Water

The hydraulic composition comprises water.

As used herein, the term "water" used with regard to the hydraulic composition preferably relates to the water added for mixing and the water of the admixtures, such as the water of liquid plasticizer.

Quantity of Water

Advantageously, the hydraulic composition comprises from 170 to 220 kg, more advantageously from 170 to 200 kg of water per cubic metre of hydraulic composition.

According to an advantageous embodiment of the method for preparing a hydraulic composition according to the invention, the amount of water used is from 170 to 250 l/m³ and preferably from 170 to 220 L/m³ and more preferably from 170 to 200 L/m³.

Advantageously, the hydraulic composition comprises from 20 to 40 parts of water, more advantageously from 20 to 30 parts of water, in relative parts by mass with respect to first Portland cement, Water-Cement Ratio The amount of water in the hydraulic composition may advantageously also be characterized by a water-cement ratio.

The water-cement ratio is typically defined as the ratio of the weight of water to the weight of cement used for the preparation of a hydraulic composition.

As used herein, the term "water-cement ratio" corresponds to the ratio of the weight of water to the sum of first Portland cement and second Portland cement weights used for the preparation of a hydraulic composition.

In the hydraulic composition of the invention, the water-cement ratio may advantageously be at least of 0.14, more advantageously is comprised between 0.14 and 0.20, preferably between 0.14 and 0.18. Advantageously, the water-cement ratio is comprised between 0.14 and 0.17.

Admixtures

The hydraulic composition according to the invention may also comprise at least an admixture, for example one of those described in the EN 934-2 standards as of September 2002, EN 934-3 standard as of November 2009 or EN 934-4 as of August 2009, and optionally mineral additions.

The hydraulic compositions according to the invention may comprise an admixture for a hydraulic composition, for example an accelerator, a viscosifying agent, an anti-foam agent, a retarder, a clay inerting agent, a shrinkage-reducing agent, a plasticizer and/or a super-plasticizer.

It should be noted that these admixtures may be added to the hydraulic binder or to the mixture according to the invention.

Superplasticizer

The hydraulic composition according to the invention may further comprise a fluidifying agent or a super-plasticizer. The hydraulic composition of the invention may comprise 0.1 to 10 parts, for example 0.1 to 7 parts of superplasticizer, in relative parts by mass with respect to first Portland cement. More preferably, the hydraulic composition of the invention comprises from 0.1 to 5 parts of a superplasticizer.

The term of "super-plasticizer" herein is to be understood as including both water reducing agents and super-plasticizers as described in the book entitled "Concrete Admixtures Handbook, Properties Science and Technology", V. S. Ramachandran, Noyes Publications, 1984.

A water reducing agent is defined as an admixture which typically reduces the amount of mixing water by 10 to 15% for a given workability. The water reducing agents include, for example lignosulfonates, hydroxycarboxylic acids, carbohydrates and other specialized organic compounds, e.g. glycerol, polyvinyl alcohol, sodium alumino-methyl-siliconate, sulfanilic acid and casein.

The super-plasticizers belong to a new class of water reducing agents, chemically different from normal water reducing agents and capable of reducing the amounts of water by about 30%. Super-plasticizers have been globally classified in four groups: sulfonated condensates of naphthalene formaldehyde (SNF) (generally a sodium salt); sulfonate condensates of melamine formaldehyde (SMF); modified lignosulfonates (MLS); and others. More recent super-plasticizers include polycarboxylic compounds such as polycarboxylates, e.g. polyacrylates. A super-plasticizer is preferably a new generation super-plasticizer, e.g. a copolymer containing a polyethylene glycol as a grafted chain and carboxylic functions in the main chain like a polycarboxylic ether. Sodium polycarboxylates-polysulfonates and sodium polyacrylates may also be used. The derivatives of phosphonic acid may also be used. The required amount of super-plasticizer generally depends on the reactivity of the cement. The lower the reactivity, the smaller is the required amount of super-plasticizer. In order to reduce the total amount of alkaline salts, the super-plasticizer may be used as a calcium salt rather than as a sodium salt.

Derivatives of phosphonic acids may also be used. Sodium polycarboxylate-polysulfonates and sodium polyacrylates may also be used. The required amount of super-plasticizer generally depends on the reactivity of the cement.

The lower the reactivity, the smaller is the required amount of super-plasticizer. In order to reduce the total content of alkaline salts, the super-plasticizer may be used as a calcium salt rather than as a sodium salt.

The super-plasticizing agents may be liquid form with a solid content comprised between 10 and 60% wt., preferably between 20 and 40% wt.

Anti-Foam Agent

The hydraulic composition according to the invention may further comprise an anti-foam agent. The hydraulic composition of the invention may comprise 0.1 to 10 parts, for example 0.1 to 7 parts of an anti-foam agent, in relative parts by mass with respect to first Portland cement. More preferably, the hydraulic composition of the invention comprises from 0.1 to 0.4 parts of an anti-foam agent.

The hydraulic composition according to the invention may further comprise an anti-foam agent, for example polydimethylsiloxane.

The anti-foam agents also comprise silicones as a solution, solid or preferably as a resin, an oil or an emulsion, preferably in water. Silicones comprising groups $(RSiO_{0.5})_n$ and $(R_2SiO)_n$ are most particularly suitable. In these formulae, the radicals R, which may either be identical or different, are preferably a hydrogen atom or an alkyl group with 1 to 8 carbon atoms, the methyl group being preferred. The number of units n is preferably from 30 to 120.

Viscosifying Agent

The hydraulic composition according to the invention may further comprise a viscosifying agent and/or an agent for modifying the flow limit (generally for increasing viscosity and/or flow limit). Such agents comprise: derivatives of cellulose, for example cellulose ethers soluble in water, such as sodium carboxymethyl, methyl, ethyl, hydroxyethyl and hydroxypropyl ethers; alginates; and xanthan, carrageenan or guar gum. A mixture of these agents may be used.

The hydraulic composition according to the invention may further comprise an accelerator and/or a retarder. However, it has to be noted the high early strength values may be obtained without any need to include a chemical accelerator. This is of interest as such chemical accelerators usually increase the strength development but have a negative effect of the fresh concrete rheology, and especially the slump retention time.

Fibers

The hydraulic composition according to the invention may further comprise fibers, for example mineral fibers (e.g. glass, basalt), organic fibers (e.g. plastic of APV type), metal fibers (e.g. steel) or a mixture thereof.

The hydraulic composition of the invention may comprise 0.1 to 35 parts, for example 10 to 30 parts of fibers, in relative parts by mass with respect to first Portland cement. More preferably, the hydraulic composition of the invention comprises from 25 to 30 parts of fibers.

The organic fibers may notably be selected from among polyvinyl alcohol (PVA) fibers, poly-acrylonitrile (PAN) fibers, high density polyethylene (HDPE) fibers, polyamide or polyimide fibers, polypropylene fibers, aramid fibers or carbon fibers. Mixtures of these fibers may also be used.

These organic fibers may appear as an object either consisting of single strand or multiple strands, the diameter of the object ranging from 25 microns to 800 microns. The individual length of the organic fibers is preferably comprised between 10 and 50 mm.

As for metal fibers, these may be metal fibers selected from among steel fibers such as high mechanical strength steel fibers, amorphous steel fibers, or further stainless steel fibers. Optionally, the steel fibers may be coated with a non-ferrous metal such as copper, zinc, nickel (or their alloys).

The individual length of the metal fibers is preferably of at least 2 mm and is, even more preferentially, comprised in the range 10-30 mm.

Fibers which are notched, corrugated or hooked-up at the ends may be used.

the amount of fibers is advantageously comprised from 0.1 to 6%, even more preferentially from 1 to 5% of the volume of the hydraulic composition.

Resorting to mixtures of fibers with different features gives the possibility of adapting the properties of the concrete with respect to the sought features.

It should be noted that the fibers may be added to the binder or to the mixture according to the invention.

The hydraulic composition according to the invention may be prepared by mixing the mixture according to the invention or the hydraulic binder according to the invention with water.

Reinforcement Agents

The hydraulic composition may be reinforced, for example with metal frames. The hydraulic composition may for example be pre-stressed, by cables or adherent tendons, or post-tensioned, with cables or tendons or sheets or non-adherent bars. The pre-stressed, as a pre-tension or post-tension, is particularly suitable for the compositions manufactured according to the present invention.

Method for Producing

A second aspect of the invention relates to a method for producing a hydraulic composition according to the invention wherein the first and second Portland cements, the sand, the water, and optionally the mineral component(s), the fibers, the superplasticizer, the anti-foaming agent, and/or other the admixtures described above are mixed.

Advantageously, the hydraulic compositions according to the invention have a compressional strength greater than or equal to 130 MPa at 24 hours after mixing. When one or more admixtures are liquid, the method advantageously comprises:

mixing the first and second Portland cements, the sand, and optionally the mineral component(s), and/or admixtures described above except the liquid admixture(s);

add water and then add the liquid admixture(s).

When fibres are used, these are preferably added after the liquid admixture(s).

The mixing of the hydraulic composition may be conducted using known methods. The hydraulic composition according to the invention may be prepared according to methods known to one skilled in the art, comprising the mixing of solid components and water, shaping (for example, casting, projection, spraying or calendaring) and hardening.

For example, the method of producing a hydraulic composition according to the invention may advantageously comprise the following steps:

a) providing a hydraulic binder according to the invention, preferably comprising first and second cements, sand and optionally the mineral component(s) as detailed above;

b) mixing the hydraulic binder of step a) with water, for example at a speed kneading of from 20 to 35 rpm, until homogenization;

c) optionally, add liquid admixtures such as superplasticizer or defoaming agent, and/or add fibres while maintaining mixing, for example at a speed kneading of from 35 to 50 rpm, until homogenization.

When fibres are used, these are preferably not added in step c), but in a subsequent step d) comprising adding the fibres to the mix obtained in step b) or step c) while maintaining mixing, preferably at a speed kneading of from 10 to 20 rpm. The same applies for liquid admixtures.

As used herein the term "rpm" means "rotations per minute".

The hydraulic composition of the invention may be used directly in the fresh state at the work site and applied to an infrastructure element such a civil engineering structure or a building to be restored, or at a precast factory, or used as a coating on a solid support.

A third aspect of the invention relates to an object formed for the field of construction comprising the hydraulic composition according to the invention.

A fourth aspect of the invention relates to a hydraulic binder comprising the materials of the hydraulic composition according to the invention with the exception of:

water; and liquid admixtures.

In other terms, the hydraulic binder according to the invention is the dry form of the hydraulic composition according to the invention. In other words, the hydraulic binder according to the invention comprises all the solid or dry components of the hydraulic composition described previously. Accordingly, the hydraulic binder comprises in relative parts by mass with respect to first Portland cement:

100 parts of a first Portland cement the particles of which have a D50 comprised between 10 and 25 μm, preferably between 10 and 16 μm, even more preferably between 11 and 15 μm;

from 25 to 76 parts of a second Portland cement the particles of which have a D50 comprised between 0.5 and 6 μm, preferentially between 0.5 and 5 μm;

from 85 to 200 parts of sand; and the volume distribution of particle size of the first Portland cement and of the second Portland cement being further such that the ratio D50 of the first Portland cement/D50 of the second Portland cement is greater than 2.

The hydraulic binder is a dry composition. In other words, the hydraulic binder comprises solid or dry components only.

The type, amounts and particle size of the first and second Portland cement of the hydraulic binder are as defined in the first aspect of the invention for the hydraulic composition.

In particular, the amount of second Portland cement relative to the amount of first Portland cement and the ratio D50 first Portland cement/D50 second Portland cement are as defined in the first aspect of the invention.

The type, amounts and particle size of the sand of the hydraulic binder are as defined in the first aspect of the invention for the hydraulic composition.

As described previously, the hydraulic binder can comprise mineral component. The type and amounts of the optional mineral component and of the sand of the hydraulic binder are as defined in the first aspect of the invention for the hydraulic composition.

Similarly, the hydraulic binder may further comprise admixtures, superplasticizer, anti-foam-agent, viscosifying agent, fibers, and combinations thereof as defined in the first aspect of the invention for the hydraulic composition as long as they are in dry form. The type and amounts of these optional components are as defined in the first aspect of the invention for the hydraulic composition.

Optionally, the hydraulic binder may be devoid of fibres.

A fifth aspect of the invention relates to the use of a hydraulic composition according to the invention in the restauration and repair of infrastructure elements such as bridge decks, pillars, beams or dams.

The following measurement methods were used:

Laser Grain Size Measurement Method

The grain size curves of the different powders are obtained with a laser Malvern MS2000 granulometer. The measurement is carried out in a suitable medium (for example, in an aqueous medium); the size of the particles should be comprised from 0.02 μm to 2 mm. The light source consists of a red He—Ne laser (632 nm) and a blue diode (466 nm). The optical model is the Fraunhofer one, the computation matrix is of the polydisperse type.

A measurement of background noise is first of all carried out with a pump rate of 2,000 rpm, a stirring rate of 800 rpm and a measurement of noise over 10 s, in the absence of ultrasonic waves. It is then checked that the light intensity of the laser is at least equal to 80%, and that a decreasing exponential curve is obtained for the background noise. If this is not the case, the lenses of the cell have to be cleaned.

A first measurement is then carried out on the sample with the following parameters: pump rate of 2,000 rpm, stirring rate of 800 rpm, absence of ultrasonic waves, obscuration limit between 10 and 20%. The sample is introduced in order to have an obscuration slightly greater than 10%. After stabilization of the obscuration, the measurement is carried out with a duration between the immersion and the measurement set to 10 s. The measurement duration is of 30 s (30,000 analysed diffraction images). In the obtained granulogram, the fact that a portion of the population of the powder may be agglomerated should be taken into account.

Next a second measurement (without emptying the tank) is then carried out with ultrasonic waves. The pump rate is brought to 2,500 rpm, the stirring to 1,000 rpm, the ultrasonic waves are 100% emitted (30 Watts). This rate is maintained for 3 minutes, and then one returns to the initial parameters: pump rate 2,000 rpm, stirrer rate of 800 rpm, absence of ultrasonic waves. After 10 s (for removing the possible air bubbles), a measurement is made for 30 s (30,000 analysed images). This second measurement corresponds to a powder de-agglomerated by ultrasonic dispersion.

Each measurement is repeated least twice in order to check the stability of the result. The apparatus is calibrated before each working session by means of a standard sample (silica C10 Sifraco) the grain size curve of which is known. All the measurements shown in the description and the announced ranges correspond to the values obtained with ultrasonic waves.

Compressional Strength Measurement Method

Regardless of the deadline, the compressional strength is measured on cylindrical sample having a diameter of 7 cm and a height of 14 cm, the surfaces on which the compressive force is applied to the sample are flattened.

The applied compressive force is increased up to a level of 3.85 kN/s during the compression test.

Slump Flow Measurement

The slump flow measurement is measured according to the ASTM 0230/0230M standard. ASTM 0230/0230M-14, Standard Specification for Flow Table for Use in Tests of Hydraulic Cement, ASTM International, West Conshohocken, PA, 2014 may be consulted.

EXAMPLES

The raw materials used in the examples are listed below:

TABLE 1 list and characteristics of materials used in the examples.

| | Description | Blaine (cm²/g) | D10 (μm) | D50 (μm) | D90 (μm) | BET (m²/g) |
|---|---|---|---|---|---|---|
| OPC 1 | CEM I 52.5N PMES Portland cement produced at Le Teil (Lafarge France) | 3 400 | 3.2 | 14.3 | 37.2 | N.A. |
| OPC2 | CEM I 52.5N PMES Portland cement produced at Le Teil (Lafarge France), lab ground to reach the target Blaine value | 12 000 | 1.8 | 3.5 | 6.6 | N.A. |
| OPC 3 | Alpena Type III Portland cement | 6 110 | 1.4 | 7.3 | 20.2 | N.A. |
| OPC 4 | Joppa class H Portland cement | 3 220 | 3.5 | 20.1 | 72.9 | N.A. |
| Durcal 5 filler | Limestone filler supplied by Omya | N.A. | 2.2 | 6.9 | 16.8 | 2.0 |
| Durcal 1 filler | Limestone filler supplied by Omya | N.A. | 0.8 | 2.2 | 6.2 | 5.8 |
| OmyaCoat 850 | Limestone filler supplied by Omya | N.A. | 0.1 | 2.0 | 15.4 | 9.9 |
| Silica fume Si | Silica fume filler supplied by RED industrial Products | N.A. | 0.3 | 0.3 | 0.3 | 20.0 |
| Rima silica fume | Silica fume filler supplied by Rima group | N.A. | 0.3 | 0.3 | 0.3 | 20.2 |
| Silver Bond 200 | Quartz filler supplied by Unimim | 3 540 | 2.3 | 21.5 | 66.2 | N.A. |
| BE01 sand | Quartz sand supplied by Sifraco | — | 230 | 355 | 544 | N.A. |
| Granulosil 4020 | Sand supplied by Unimim | — | 194 | 332 | 550 | N.A. |
| μGypsum | Supplied by Siniat | — | 3.3 | 30.9 | 120.9 | N.A. |

N.A.: not applicable

Unless stated otherwise, all the materials were used as received from the manufacturers.

The Portland cements that are ground in the laboratory to increase the Blaine value are ground in a closed ball mill operating a room temperature. The grinding processes is stopped when the target Blaine is achieved. The very fine Portland cements of the present examples have a D50 of less than 5 μm, and such levels fineness are typically achieved by jet air grinding processes and not ball mills.

Admixtures

Ductal® F2 is a superplasticizer supplied by Chryso which has a solid content of 30 wt. %.

The steel fibres used are supplied by Dominion and have a size of 14 mm of length and 0.2 mm of diameter.

A defoaming agent, Dehydran supplied by Cognis, is used so that the air content in the hardened concrete remains low, i.e. below 2.0 vol.-%.

A defoaming agent, Surfynol 610 supplied by Air products, is used so that the air content in the hardened concrete remains low, i.e. below 2.0 vol.-%.

Example 1: Results Obtained with UHPC Compositions Containing a Very Fine Portland Cement and Normal Portland Cement Material and Methods The UHPC was produced following the protocol described below:

1) charging the dry raw materials in the drum of the Rayneri kneader-mixer;

2) from 0 to 4 minutes: initiation of slow speed kneading (10 rpm) to homogenise the premix;

3) from 4 minutes to 4 minutes 30 seconds: adding the mixing water in 30 seconds, at a rotation speed of 35 rpm;

4) from 4 minutes 30 seconds to 5 minutes: adding the admixture in 30 seconds, at a rotation speed of 35 rpm;

5) from 8 minutes if particles are deflocculated (the texture of the mix changes from powders to paste liked): increasing a rotation speed from 35 rpm to 50 rpm, otherwise waiting until the particles may deflocculate. Then mixing at a rotation speed of 50 rpm for 3 minutes.

6) Stopping the mixer, adding the 50% of fibers. Then mixing at a rotation speed 15 rpm for 30 seconds.

7) Adding the rest of fibers. Then mixing at a rotation speed 15 rpm for 6 minutes 30 seconds.

Compressive strength (CS) and slump flow were measured following the above-described protocols.

Results

The results summarised in Table 2 to Table 5 show that the UHPC hydraulic compositions M1 and M2, in which two Portland cements of different particle size distributions are used, have a compressive strength at 24 hours of 140 and 147 MPa, respective. This represents a significant increase compared to the strength of the reference hydraulic compositions M0 and M0'.

The two comparative references M0 and M0' are similar is that they both contain one type of Portland cement, and have the same water cement ratio. They differ in the fact that M0 makes use of two fillers, the limestone filer Durcal 5 combined with silica fume, and M0' makes use of Durcal 1, very fine limestone filler and no silica fume. The strength at 24 hours of M0 and M0' is respectively 75 MPa and 94 MPa.

The results also show that for composition M1 an M2 particular high compressive strength values can be achieved even though no fine filler materials such as ground limestone or silica fume is used. Also, these high early strength values are obtained without any need to include a chemical accelerator. This is of interest as such products usually increase the strength development but have a negative effect of the fresh concrete rheology, and especially the slump retention time.

The results show that the strength development of the UHPC compositions M1 and M2 remains high at 28 days, at above 190 MPa compared to 172 and 163 MPa for M0 and M0', respectively.

All concrete mixes M0, M0', M1 and M2 have high slump flow values, which means that the concrete mixes M1 and M2 are so-called self-levelling concretes, even though their early strength is significantly higher that known UHPC compositions.

TABLE 2

UHPC mix designs containing a very fine Portland cement and a normal Portland cement, compared to reference mix designs M0 and M0'. The amount of fibres corresponds to a volume of 2% of one cubic metre of concrete.

| | M0 (kg/m³) (not according to invention) | M0' (kg/m³) (not according to the invention) | M1 (kg/m³) | M2 (kg/m³) |
|---|---|---|---|---|
| Water | 157 | 158 | 182 | 196 |
| OPC 1 | 748 | 751 | 729 | 815 |
| OPC 2 | 0 | 0 | 421 | 413 |
| Durcal 5 filler | 224 | 0 | 0 | 0 |
| Durcal 1 filler | 0 | 376 | 0 | 0 |
| Rima Silica fume | 187 | 0 | 0 | 0 |
| BE01 sand | 1023 | 1074 | 1042 | 942 |
| Dehydran Antifoam | 2.0 | 2.0 | 2.0 | 1.9 |
| Ductal ® F2 | 35 | 33.0 | 31.0 | 25.0 |
| Fibres Dominion (kg) | 156 | 156 | 156 | 156 |
| W/C ratio | 0.21 | 0.21 | 0.16 | 0.16 |

TABLE 3

P0, P0', P1 and P2 corresponds to UHPC composition M0, M0', M1 and M2 expressed in relative parts by mass with respect to OPC 1.

| | P0 (in relative parts by mass with respect to OPC1) | P0' (in relative parts by mass with respect to OPC1) | P1 (in relative parts by mass with respect to OPC1) | P2 (in relative parts by mass with respect to OPC1) |
|---|---|---|---|---|
| Water | 21 | 21 | 25 | 24 |
| OPC 1 | 100 | 100 | 100 | 100 |
| OPC 2 | 0 | 0 | 57.8 | 50.7 |
| Durcal 5 filler | 29.9 | 0 | 0 | 0 |
| Durcal 1 filler | 0 | 50.1 | 0 | 0 |
| Rima Silica fume | 25 | 0 | 0 | 0 |
| BE01 sand | 136.8 | 143 | 142.9 | 115.6 |
| Dehydran Antifoam | 0.3 | 0.3 | 0.3 | 0.2 |
| Ductal ® F2 | 4.7 | 4.4 | 4.25 | 3.1 |
| Fibres Dominion | 20.9 | 20.8 | 21.4 | 19.1 |

Results

The results are presented below:

TABLE 4 slump flow and compressive strength achieved with the UHPC compositions M0, M0', M1 and M2.

| | M0 | M0' | M1 | M2 |
|---|---|---|---|---|
| Slump flow (mm) | | | | |
| Initial slump flow without fibre after 1 min[a] | 235 | 250 | 265 | 300 |
| Initial slump flow without fibre stabilized[b] | 270 | 295 | 305 | 330 |
| With fibres end of mixing after 1 min | 230 | 235 | 240 | 270 |
| With fibres end of mixing stabilized | 270 | 275 | 270 | 310 |
| With fibres T60 min after 1 min | 215 | N.A. | N.A. | 260 |
| With fibres T60 min stabilized | 250 | N.A. | N.A. | 300 |

TABLE 4-continued slump flow and compressive strength achieved with the UHPC compositions M0, M0', M1 and M2.

| | M0 | M0' | M1 | M2 |
|---|---|---|---|---|
| Compressive strength (MPa) | | | | |
| 24 h compressive strength | 75.2 | 93.8 | 140.2 | 147.2 |
| 28 d compressive strength | 172.0 | 163.4 | 193.5 | 192.9 |
| Air content in hardened concrete | | | | |
| vol.-% air calculated | 1.9 | 0.6 | 0.2 | 0.8 |

[a] "after 1 min" means at 1 min after the ASTM cone for the flow test is removed.
[b] "stabilized" means when the hydraulic composition does not move anymore.
N.A.: Not available Table 5 below summarises the shrinkage behaviour of the two UHPC composition M1 and M2 that develop the highest strength at 24 hours, compared to the reference UHPC composition M0, with M0, M1, M2.

The results show that the concretes M1 and M2 have in general a slightly lower tendency to shrink that the reference concrete M0.

TABLE 5

Shrinkage of UHPC compositions M1 and M2.

| | Strength at 24 hours (MPa) | Autogenous Shrinkage from 0 to 1 days by RAJA test (μm/m) | Total Shrinkage measurement from 1 days to 90 days on 4 cm × 4 cm × 16 cm prism | | | | | Total Shrinkage (μm/m) |
|---|---|---|---|---|---|---|---|---|
| | | | 7 days | 14 days | 28 days | 56 days | 90 days | |
| M0 | 75 | −254 | −285 | N.A. | −429 | −558 | −597 | −815 |
| M1 | 140 | −282 | −231 | −314 | −358 | −437 | −477 | −759 |
| M2 | 147 | −245 | −293 | −295 | −341 | −427 | −470 | −715 |

N.A.: Not avaiable

Comparative Example 1: Results Obtained with a Fine Portland Cement and a Coarse Portland Cement Material and Methods In this example a UHPC is prepared using two Portland cements that have different particle size distributions, but having a composition not according to the invention. The UHPC compositions M3 and M4 are given in Table 6 below. P4 corresponds to UHPC composition M4 expressed in relative parts by mass with respect to OPC 4.

TABLE 6

UHPC composition M3, UHPC composition M4 and P4 UHPC composition (UHPC composition M4 expressed in relative parts by mass with respect to OPC 4), that contain one fine Portland cement and one coarse Portland cement. The amount of fibres added corresponds to a volume of 2% of one cubic metre of concrete.

| | M3 (kg/m³) Not according to the invention | M4 (kg/m³) Not according to the invention | P4 (in relative parts by mass with respect to OPC 4) |
|---|---|---|---|
| Water | 170 | 205 | 43.6 |
| OPC 3 | 547 | 667 | 141.9 |
| OPC 4 | 0 | 470 | 100 |
| Silver Bond 200 | 402 | 0 | 0 |
| RED Silica fume S1 | 130 | 127 | 27.02 |

TABLE 6-continued

UHPC composition M3, UHPC composition M4 and P4
UHPC composition (UHPC composition M4 expressed
in relative parts by mass with respect to OPC 4),
that contain one fine Portland cement and one coarse
Portland cement. The amount of fibres added corresponds
to a volume of 2% of one cubic metre of concrete.

| | M3 (kg/m³) Not according to the invention | M4 (kg/m³) Not according to the invention | P4 (in relative parts by mass with respect to OPC 4) |
|---|---|---|---|
| μGypsum | 15 | 0 | 0 |
| Granusil 4020 Sand | 997 | 852 | 181.3 |
| Surfynol 610 | 0.3 | 0.3 | 0.1 |
| Ductal ® F2 | 27 | 33 | 7.0 |
| Fibres Dominion (kg) | 156 | 156 | 33.2 |
| W/C ratio | 0.31 | 0.18 | — |

Results

The results are detailed in Table 7 below:

TABLE 7 slump flow and compressive strength achieved with the
UHPC compositions M3 and M4.

| | M3 | M4 |
|---|---|---|
| Initial slump flow without fibre after 1 min[a] | 255 | 280 |
| Initial slump flow without fibre stabilized[b] | 290 | 300 |
| With fibres end of mixing after 1 min | 200 | 255 |
| With fibres end of mixing stabilized | 225 | 280 |
| With fibres T60 min after 1min | 185 | 250 |
| With fibres T60 min stabilized | 195 | 260 |
| With fibres T90 min after 1min | 140 | 220 |
| With fibres T90 min stabilized | 155 | 240 |
| With fibres T120 min after 1min | — | 170 |
| With fibres T120 min stabilized | — | 180 |
| 24 h compressive strength | 82.2 | 101.1 |
| 28 d compressive strength | 164.9 | 168.2 |
| vol.-% air calculated | 2.6 | 1.4 |

[a] " after 1 min" means at 1 min after the ASTM cone for the flow test is removed.
[b] " stabilized" means when the hydraulic composition does not move anymore.

The results given in Table 7 show that the simple combination of one fine Portland cement and one coarse Portland cement is not sufficient to achieve a high early age strength above the desired threshold of 130 MPa.

Comparative Example 2—Mixing Process of
UHPC Compositions and Preferred Compositions In order to produce the desired ultra-high early ages strength concretes of the present inventions, preferred particle size distributions and amounts of components of the premix so that the UHPC compositions can be effectively mixed in a concrete batching plant.

If the particle size distribution and the content of the components used to prepare the dry premix or the UHPC composition are not selected carefully, then phenomenon such as jamming occur. In the worst cases, such UHPC compositions can in practice not be mixed in a concrete mixer or batching plant.

Another possible consequence is that the resulting fresh concrete loses its capacity to flow, rendering the concrete non-usable in construction applications.

The mere fact of adding a finer Portland cement to increase early age strength would therefore often, in practice, not be successful due to the reasons detailed above.

This example summarizes UHPC hydraulic compositions that are susceptible to jamming or which do not produce fresh concrete that is able to flow.

UPHC M5

The UHPC M5 was prepared by substituting, in M0 as described in Example 1, the limestone filler Durcal 5 by OPC 2, which is very fine. The contents of each component, given in kg/m³, vary slightly to compensate the fact that limestone filler does not have the same density as Portland cement. The UHPC compositions M0 and M5 are given in Table 8 below. P5 corresponds to UHPC composition M5 expressed in relative parts by mass with respect to OPC 1.

TABLE 8

UHPC hydraulic compositions where a fine limestone
is replaced by a very fine Portland cement

| | M0 (kg/m³) (not according to the invention) | M5 (kg/m³) (not according to the invention) | P5 (in relative parts by mass with respect to OPC 1) |
|---|---|---|---|
| Water | 157 | 161 | 21.6 |
| OPC 1 | 748 | 746 | 100 |
| OPC 2 | 0 | 258 | 34.6 |
| Durcal 5 filler | 224 | 0 | 0 |
| Silica fume S1 | 187 | 186 | 24.9 |
| BE01 sand | 1023 | 1022 | 137 |
| Dehydran Antifoam | 2.0 | 2.0 | 0.3 |
| Ductal ® F2 | 35 | 35 | 4.7 |
| Fibres Dominion (kg) | 156 | 156 | 20.9 |
| W/C ratio | 0.21 | 0.16 | — |

Results:

The corresponding UHPC composition M5 creates a jamming in a concrete mixer, and is therefore not suitable.

UPHC M6

The UHPC M6 was prepared by substituting, in M0' as described in Example 1, the limestone filler Durcal 1 by OPC 2. The Durcal 1 and OPC 2 both are very fine. The contents of each component, given in kg/m³, vary slightly to compensate the fact that limestone filler does not have the same density as Portland cement. The UHPC compositions M0' and M6 are given in Table 6 below. P6 corresponds to UHPC composition M6 expressed in relative parts by mass with respect to OPC 1.

TABLE 9

UHPC hydraulic compositions wherein a fine limestone
filler is replaced by a very fine Portland cement

| | M0' (kg/m³) (not according to the invention) | M6 (kg/m³) (not according to the invention) | P6 (in relative parts by mass with respect to OPC 1) |
|---|---|---|---|
| Water | 158 | 158 | 21 |
| OPC 1 | 751 | 751 | 100 |
| OPC 2 | 0 | 434 | 57.8 |
| Durcal 1 filler | 376 | 0 | 0 |
| BE01 sand | 1074 | 1074 | 143 |
| Dehydran Antifoam | 2.0 | 2.0 | 0.3 |
| Ductal ® F2 | 33.0 | 40.0 | 5.3 |
| Fibres Dominion (kg) | 156 | 156 | 20.8 |
| W/C ratio | 0.21 | 0.13 | — |

Results: The corresponding UHPC composition M6 creates a jamming in a concrete mixer, and is therefore not suitable.

The invention claimed is:

1. A hydraulic composition comprising in relative parts by mass with respect to first Portland cement:

100 parts of a first Portland cement the particles of which have a D50 comprised between 10 and 25 μm;

from 25 to 76 parts of a second Portland cement the particles of which have a D50 comprised between 0.5 and 6 μm;

from 85 to 200 parts of sand;

water;

O the water content being such that the hydraulic composition comprises from 170 to 250 kg of water per cubic metre of hydraulic composition;

the volume distribution of particle size of the first Portland cement and of the second Portland cement being further such that the ratio D50 of the first Portland cement/D50 of the second Portland cement is greater than 2, and wherein the hydraulic composition is self-leveling.

2. The hydraulic composition according to claim 1 wherein the hydraulic composition comprises from 0 to 60 parts, as expressed in relative parts by mass with respect to first Portland cement, of one or more mineral components selected from silica fumes, pozzolanic materials, slags, calcined shales, materials containing calcium carbonate, siliceous additions, fly ashes, or mixtures thereof.

3. The hydraulic composition according to claim 1, wherein the first and/or the second Portland cement is a CEM I cement.

4. The hydraulic composition according to claim 1, wherein the sand has particles the D50 of which is between 200 μm and 3 mm.

5. The hydraulic composition according to claim 1, wherein the sand is a siliceous sand, a calcined bauxite sand, a siliceous limestone sand, a limestone sand, or mixtures thereof.

6. The hydraulic composition according to claim 1, further comprising from 0 to 35 parts of fibers.

7. The hydraulic composition according to claim 1, further comprising from 0 to 10 parts of superplasticizer.

8. The hydraulic composition according to claim 1, further comprising from 1 to 3 parts, of an anti-foaming agent.

9. A method for producing a hydraulic composition according to claim 1, wherein the first and second Portland cements, the sand, water, and optionally mineral component(s), fibers, a superplasticizer and/or an anti-foaming agent are mixed.

10. An object formed for the field of construction comprising the hydraulic composition according to claim 1.

11. A method comprising utilizing the hydraulic composition according to claim 1 in the restoration and repair of infrastructure elements.

12. The hydraulic composition according to claim 1, wherein particles of the first Portland cement have a D50 comprised between 10 and 16 μm.

13. The hydraulic composition according to claim 1, wherein particles of the first Portland cement have a D50 comprised between 11 and 15 μm.

14. The hydraulic composition according to claim 1, wherein particles of the second Portland cement have a D50 between 0.5 and 5 μm.

15. The hydraulic composition according to claim 1, wherein the hydraulic composition comprises from 0 to less than 20 parts, as expressed in relative parts by mass with respect to first Portland cement, of one or more mineral components selected from silica fumes, pozzolanic materials, slags, calcined shales, materials containing calcium carbonate, limestone, siliceous additions, fly ashes, or mixtures thereof.

16. A hydraulic binder in relative parts by mass with respect to first Portland cement:

100 parts of a first Portland cement the particles of which have a D50 comprised between 10 and 25 μm;

from 25 to 76 parts of a second Portland cement the particles of which have a D50 comprised between 0.5 and 6 μm;

from 85 to 200 parts of sand;

the volume distribution of particle size of the first Portland cement and of the second Portland cement being further such that the ratio D50 of the first Portland cement/D50 of the second Portland cement is greater than 2, and wherein the hydraulic binder does not comprise liquid admixtures, wherein upon being combined with water, to form a hydraulic composition, in an amount ranging from 170 to 250 kg of water per cubic metre of hydraulic composition, the hydraulic composition is self-leveling.

* * * * *